United States Patent [19]

Homan et al.

[11] 4,279,792

[45] Jul. 21, 1981

[54] COMPOSITIONS INCLUDING MERCAPTOORGANOPOLYSILOXANES AND STANNOUS SALTS OF CARBOXYLIC ACIDS

[75] Inventors: Gary R. Homan; Chi-long Lee, both of Midland, Mich.

[73] Assignee: Dow Corning Corporation, Midland, Mich.

[21] Appl. No.: 99,301

[22] Filed: Dec. 3, 1979

[51] Int. Cl.$^3$ ............................................. C08L 91/00
[52] U.S. Cl. .............................. 260/18 S; 260/37 SB; 528/18; 528/24; 528/30; 528/43
[58] Field of Search .......................... 260/18 S, 37 SB; 528/18, 24, 30, 43

[56] References Cited

U.S. PATENT DOCUMENTS

| | | | |
|---|---|---|---|
| 3,445,419 | 5/1969 | Vanderlinde | 260/37 |
| 3,655,713 | 4/1972 | Le Grow | 260/448.2 N |
| 3,816,282 | 6/1974 | Viventi | 204/159.13 |
| 3,873,499 | 3/1975 | Michael et al. | 204/159.13 |
| 4,039,504 | 8/1977 | Homan et al. | 260/37 SB |
| 4,039,505 | 8/1977 | Homan et al. | 260/37 SB |
| 4,064,027 | 12/1977 | Gant | 204/159.13 |
| 4,066,603 | 1/1978 | Homan et al. | 260/37 SB |
| 4,070,328 | 1/1978 | Homan et al. | 260/37 SB |
| 4,070,329 | 1/1978 | Homan et al. | 260/37 SB |

FOREIGN PATENT DOCUMENTS 2008426  2/1970  Fed. Rep. of Germany .

Primary Examiner—Melvyn I. Marquis
Attorney, Agent, or Firm—Roger H. Borrousch

[57] ABSTRACT

Mixing mercaptoorganopolysiloxanes with a stannous salt of a carboxylic acid, and optionally an organic peroxide and/or a filler, provides useful new compositions such as materials curable to elastomers at room temperature.

5 Claims, No Drawings

COMPOSITIONS INCLUDING MERCAPTOORGANOPOLYSILOXANES AND STANNOUS SALTS OF CARBOXYLIC ACIDS

BACKGROUND OF THE INVENTION

1. Field of the Invention

This invention relates to compositions including siloxane polymers and siloxane elastomers containing sulfur.

2. Description of the Prior Art

Applicants' U.S. Pat. Nos. 4,039,504 and 4,039,505 are generally directed to compositions curable to elastomers at room temperature or with heat. These compositions are prepared from mixtures of certain polymethylvinylsiloxanes and mercaptoorganopolysiloxanes with an organic peroxide, and optionally a filler.

Applicants' U.S. Pat. No. 4,070,329 discloses compositions prepared from mixtures of mercaptoorganopolysiloxanes, and organic peroxide catalysts. Applicants' U.S. Pat. No. 4,070,328 discloses compositions prepared from mixtures of mercaptoorganopolysiloxanes, organic hydroperoxide, and selected nitrogen compounds. The compositions prepared according to these references can be used as sealants which rapidly cure to elastomers with non-tacky surfaces.

Numerous other prior art references are directed to compositions involving mercaptoorganopolysiloxanes and mixtures thereof with alkenyl-containing siloxanes as well as to curing systems employing electromagnetic and particulate radiation. These references include: U.S. Pat. No. 3,445,419; U.S. Pat. No. 3,816,282; U.S. Pat. No. 3,873,499; German Patent Publication (OLS) No. 2,008,426; U.S. Pat. No. 4,064,027; U.S. Pat. No. 4,066,603; and, U.S. Patent Application Ser. No. 663,326, filed Mar. 3, 1976, by Gary N. Bokerman and Robert E. Kalinowski, entitled "Method of Curing Thick Section Elastomers" and assigned to the same assignee as the present invention. The disclosures of the above-identified patents and applications are specifically incorporated by reference herein for the purpose of exemplifying the state of the prior art.

Although the prior art describes elastomeric materials formed by mixing mercaptoorganopolysiloxanes with alkenyl-containing polysiloxanes and organic peroxides, by mixing mercaptoorganopolysiloxanes with organic peroxides alone, or by mixing mercaptoorganopolysiloxanes with organic hydroperoxides and selected nitrogen compounds, it was not expected that useful materials, including elastomeric materials, could be provided by mixing, at room temperature, mercaptoorganopolysiloxanes and stannous salts of carboxylic acids. Nor was it expected that the stannous compounds, when used in mixtures of mercaptoorganopolysiloxanes and organic peroxides would substantially increase the rate of curing of the mixture to provide elastomeric compositions.

SUMMARY OF THE INVENTION

According to the present invention, novel compositions of matter are provided by mixing mercaptoorganopolysiloxanes with stannous salts of carboxylic acids. Included among the compositions provided according to the invention are compositions curable to elastomers at room temperature in the presence of an oxygen-containing atmosphere such as air. Curable compositions of the invention may optionally include fillers and provide sealants which cure rapidly to elastomeric materials with non-tacky surfaces. Compositions prepared from an organic peroxide, a mercaptoorganopolysiloxane and a stannous salt cure to elastomers in a shorter time than compositions prepared from mercaptoorganopolysiloxane and a stannous salt.

DESCRIPTION OF THE INVENTION

This invention relates to compositions of matter comprising materials prepared by mixing (A) a mercaptoorganopolysiloxane consisting essentially of a combination of units selected from dimethylsiloxane units, trimethylsiloxane units, hydroxydimethylsiloxane units, units of the formula

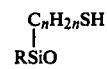

units of the formula

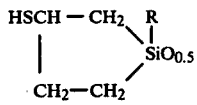

units of the formula

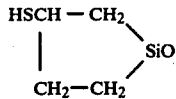

and units of the formula

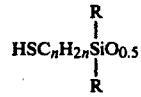

wherein: R is a monovalent radical selected from the group consisting of alkyl radicals of from 1 to 3 carbon atoms inclusive and phenyl radicals; and, n has a value of from 1 to 4 inclusive, there being in said mercaptoorganopolysiloxane an average of greater than two mercapto-containing siloxane units per molecule and no more than 10 mole percent mercapto-containing siloxane units based on the total number of siloxane units in the mercaptoorganopolysiloxane;

(B) a stannous salt of a carboxylic acid selected from the group consisting of those represented by the formula

wherein $R^1$ is a monovalent acyl radical;

(C) a filler in an amount of from 0 to 200 parts by weight per 100 parts by weight of (A); and (D) an organic peroxide in an amount equal to from 0 to about 6 parts by weight per 100 parts by weight of (A).

Incorporated by reference herein are applicants' U.S. Patent Application Ser. Nos. 099,299 and 099,298, filed concurrently herewith and respectively entitled "Compositions Including Mercaptoorganopolysiloxanes and Stannic Salts of Carboxylic Acids" and "Mercaptoorganopolysiloxane Elastomers Catalyzed by Metallic Compounds in the Presence of Peroxides".

The mercaptoorganopolysiloxanes useful in practice of the present invention include those consisting essentially of dimethylsiloxane units, trimethylsiloxane units, hydroxdimethylsiloxane units, and units represented by the formulas

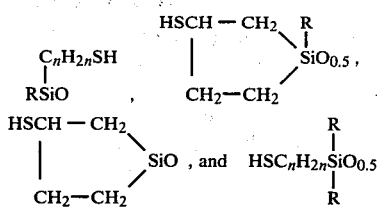

wherein: R is a monovalent radical selected from the group consisting of alkyl radicals of from 1 to 3 carbon atoms inclusive (such as methyl, ethyl and propyl) and phenyl radicals; and n has a value of from 1 to 4 inclusive and preferably has a value of 3, there being present in such mercaptoorganopolysiloxanes an average of at least two mercapto-containing siloxane units per molecule and no more than 10 mole percent mercapto-containing siloxane units based on the total units in the mercaptoorganopolysiloxane.

Examples of the mercaptoorganopolysiloxanes include those having "terminal" mercapto groups such as those represented by the formulas I and II:

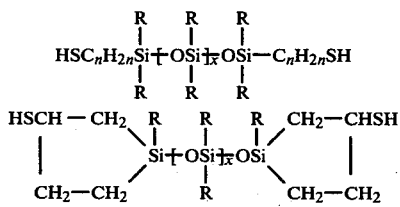

wherein R, and n are as defined above and x has a value of from 18 to 1000 and preferably 200 to 800, and those having "pendant" mercapto groups such as those represented by formulas III through VI:

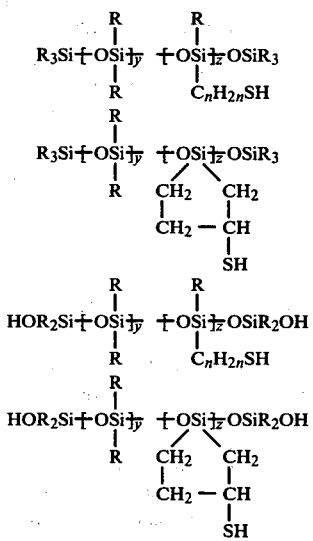

wherein n and R are as above; y+z has a value of from 18 to 1000 and preferably 200 to 800, and z is at least 2 and no more than a number providing 10 mole percent mercapto-containing siloxane units, based on total siloxane units in the polymer.

The mercaptoorganopolysiloxanes of formulas I and III are known in the art as evidenced by the prior art cited herein. The mercaptosilacyclopentylpolysiloxanes of formulas II and IV and their position isomers can be prepared by the method defined in U.S. Pat. No. 3,655,713, which is hereby incorporated by reference to show the mercaptosilacyclopentylpolysiloxanes and their preparation.

Preferred stannous salts of carboxylic acids useful in practice of the invention can be represented by the formula:

$$Sn(OR^1)_2$$

wherein $R^1$ is a monovalent acyl radical. Monovalent acyl radicals, $R^1$, providing suitable stannous salts include acetyl, propionyl, isobutyryl, stearoyl, lauroyl, 2-ethylhexoyl (sometimes referred to as "octanoyl"), oleoyl, linoleoyl, benzoyl, naphthoyl, β-benzoyl-propionyl, crotonyl, atropoyl, palmitoyl, and cinnamoyl. Stannous di-(2-ethylhexanoate) is preferred. Preferred quantities of stannous salt range from about 0.1 to about 10.0 parts by weight per 100 parts by weight of polymer.

The compositions of this invention can be prepared by mixing at least one mercaptoorganopolysiloxane as described by one of the formulas III and IV wherein the average value of z is greater than 2 with a stannous salt to provide a one package product which will crosslink to a gel-like product or an elastomeric product depending upon the crosslink density. The one package products may have limited storage stability in a container sealed to exclude air, however, packaged compositions can be stored up to six months or more. The storage stability should be determined for each composition prepared on a small sample prior to making large amounts of composition. The suitability of the container and manner of sealing should also be determined using small samples. The length of time the composition can be stored in a sealed container can be influenced by the type of container (e.g., the material used to make the container, because some materials can allow oxygen to penetrate); the tightness of the seal; and the nature of the ingredients used to make the composition. The amount of stannous salt can vary from 0.1 to 10 parts by weight per 100 parts by weight mercaptoorganopolysiloxane, preferably from 1 to 6 parts by weight stannous salt per 100 parts by weight mercaptoorganopolysiloxane. Fillers can be used to provide elastomeric products with improved properties.

Compositions of this invention can also be prepared by mixing at least one mercaptoorganopolysiloxane as described by one of the formulas III and IV wherein the average value of z is greater than 2, and at least one mercaptoorganopolysiloxane as described by one of the formulas I and II with a stannous salt to provide a one package product as described above. The amount of stannous salt and the use of fillers is the same as described above. In these compositions, the amounts of mercaptoorganopolysiloxane of formulas I and II and of formulas III and IV can vary broadly, but the amounts should be present to provide an average number of mercapto groups per molecule of at least 2.1.

In the above compositions, the mercaptoorganopolysiloxanes which are preferred are those of formulas I through IV in which the R is methyl and n is 3.

Compositions can also be prepared by mixing one or more mercaptoorganopolysiloxanes, a stannous salt, and an organic peroxide. Examples of suitable peroxides include 2,4-dichlorobenzoyl peroxide, tertiary-butyl perbenzoate, benzoyl peroxide, di-tertiary-butyl peroxide, tertiary-butyl peroctoate, dicumyl peroxide, 2,5-bis(tertiary-butylperoxy)-2,5-dimethylhexane, paramenthane hydroperoxide, t-butyl hydroperoxide and cumene hydroperoxide. The quantity of organic peroxide can vary from about 1 to about 6 parts by weight per 100 parts by weight of mercaptoorganopolysiloxane. These compositions containing peroxide rapidly cure in thick section when the ingredients are mixed.

When the stannous salts are incorporated in mixtures of the invention including a mercaptoorganopolysiloxane and an organic peroxide, the stannous salt promotes the cross-linking of polymers through —S—S— covalent bonds. In such peroxide-containing compositions lesser quantities of the stannous salt can be used than when only the stannous salt is used.

Irrespective of the mechanism of action, the use in compositions of the invention of mercaptoorganopolysiloxanes of formulas III and IV, alone or in combination with polymers of formulas I and II, will result in the formation of elastomeric materials.

Fillers can be used in the compositions of this invention, but are not required. The fillers can be both treated and untreated reinforcing fillers, such as fume silica and fume silica having triorganosiloxy groups, such as trimethylsiloxy groups on the surface, carbon black or precipitated silica, and extending fillers such as crushed or ground quartz, diatomaceous earth, and calcium carbonate. The curable elastomeric compositions contain filler up to about 200 parts by weight per 100 parts by weight mercaptoorganopolysiloxanes.

The compositions of this invention which contain no organic peroxide and which cure to elastomers, do so rapidly at room temperature in the presence of an oxygen-containing atmosphere such as air. The resulting elastomer has a dry or non-tacky surface. The rate of cure can be accelerated with the use of heat. Air inhibition such as is observed with conventional non-mercapto-containing peroxide cured silicone rubber composition is not observed and the inhibition by various materials such as sulfur and phosphorus as observed in platinum catalyzed compositions containing aliphatic unsaturated siloxanes and SiH-containing siloxanes, is not observed. Rapidly curing elastomers of the invention are expected to be exceptionally useful sealants and can be provided in the form of mixtures of mercaptoorganopolysiloxanes (optionally including a filler) and stannous salt packaged as a one package sealant system which cures upon exposure to air. Compositions of the invention provided by mixing of mercaptoorganopolysiloxanes, peroxide and stannous salt should be packaged as a two or three package system because mixtures of these three ingredients are unstable when combined. High speed mixing and dispensing equipment is suggested to thoroughly mix ingredients of compositions containing peroxide and place them in position for cure before substantial curing takes place.

The following examples are presented for illustration purposes and should not be construed as limiting the invention.

EXAMPLE 1

An elastomer was prepared by mixing 100 grams of a polymer of the average formula

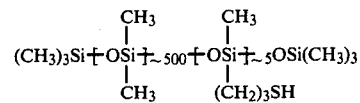

with 2 grams of stannous octoate. The polymer had a mercapto content of 0.49 weight percent —SH (or 0.0148 moles —SH/100 g polymer) as determined by iodine titration. The resulting mixture was allowed to cure at room temperature. The snap time, which is defined as the length of time required for the composition to obtain recovery properties, was less than three hours. After 24 hours the composition was substantially cross-linked, but had rather soft gummy properties.

EXAMPLE 2

An elastomer was prepared by heating a sample of the mixture of Example 1 in air at 150° C. After 15 minutes the sample had thickened and a surface skin had formed. The surface was fully cured after 30 minutes although the lower portion was still uncured.

EXAMPLE 3

Ten grams of the mercaptoorganopolysiloxane of the average formula

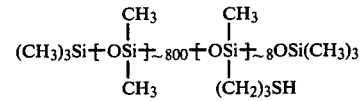

was mixed with 0.1 g stannous octoate (6 drops). The polymer had a 0.44 weight percent —SH by iodine titration. Thereafter 0.1 g t-butyl hydroperoxide (6 drops) was added. The material immediately began to gel during mixing. The time required for completion of the cure was difficult to determine due to rather incomplete mixing occasioned by rapid gelation. The estimated cure time was less than about 5 minutes.

EXAMPLE 4

A mixture was prepared as described in Example 3, except 0.05 g of the hydroperoxide (3 drops) was used. Once again, the material gelled immediately upon mixing. A cure was noted in about 5 minutes, although there appeared to be some spotty uncured areas. After about 1 hour, the entire material was completely cured.

EXAMPLE 5

Ten grams of mercaptoorganopolysiloxane as defined in Example 3 was mixed with 0.1 g stannous octoate (6 drops), and 0.5 g of the hydroperoxide (30 drops). The material cured immediately upon the addition of the hydroperoxide.

EXAMPLE 6

A mixture of 10 g of the polymer defined in Example 3 with 0.05 g of stannous octoate (3 drops) was prepared. To this mixture, there was added 0.1 g of t-butyl hydroperoxide (6 drops). The material gelled to a snap immediately and a completely dry cure was observed in about 6 hours.

EXAMPLE 7

A mixture was prepared as described in Example 6, except 0.01 g of stannous octoate (1 microdrop) and 0.1 g of the hydroperoxide were used. The resulting mixture gelled immediately but did not display snap characteristics until 2.5 minutes after mixing. After 24 hours at room temperature, the material was still not completely cured.

EXAMPLE 8

A mixture was prepared as described in Example 6, except 0.005 g of stannous octoate was used. The resulting mixture did not gel at all during mixing. After 24 hours at room temperature the sample was slightly thicker in consistency and after 24 hours additional time at 150° C. the sample appeared to be more cross-linked but still was not completely cured.

EXAMPLE 9

To a mixture of 10 g of the polymer as described in Example 3 and 0.1 g of stannous octoate (6 drops) was added 0.5 g of t-butylperbenzoate (30 drops). The material cured completely within 30 seconds after mixing.

EXAMPLE 10

To a mixture of polymer and stannous octoate as described in Example 9, there was added 0.1 g of t-butyl perbenzoate (6 drops). The material gelled immediately and was cured completely in less than 2 minutes.

EXAMPLE 11

To a mixture of polymer and stannous octoate as described in Example 9, there was added 0.05 g of t-butyl perbenzoate (3 drops). This mixture gelled immediately and cured with a tacky surface in about 30 seconds. The surface became tack-free in less than about 5 minutes.

EXAMPLE 12

To a mixture of 100 g of the polymer as described in Example 3 and 1 g of stannous octoate, there was added 5.0 g of t-butyl hydroperoxide. The material cured at room temperature in less than 30 seconds to give a deep section cured elastomer with a tack-free surface.

EXAMPLE 13

A mixture was prepared by mixing 100 g of the polymer as described in Example 3 and 5.0 g of t-butyl hydroperoxide. A complete cure was not observed until about 7 days after mixing.

The results obtained in Examples 3 through 13 above are summarized in Table 1, which designates the weights of polymer, stannous octoate, and peroxide and indicates the approximate time necessary for a cure at room temperature.

TABLE 1

| Example No. | Weight Polymer, g | Weight Stannous Octoate, g | Weight Peroxide, g | Cure Time at Room Temperature (Minutes) |
|---|---|---|---|---|
| 3 | 10 | 0.1 | 0.1 | ~5 |
| 4 | 10 | 0.1 | 0.05 | 60 |
| 5 | 10 | 0.1 | 0.5 | <1 |
| 6 | 10 | 0.05 | 0.1 | 360 |
| 7 | 10 | 0.01 | 0.1 | gelled but not cured |
| 8 | 10 | 0.005 | 0.1 | gelled but not cured |
| 9 | 10 | 0.1 | 0.5 | <0.5 |
| 10 | 10 | 0.1 | 0.1 | <2 |
| 11 | 10 | 0.1 | 0.05 | <5 |
| 12 | 100 | 1.0 | 5.0 | <0.5 |
| 13 | 100 | — | 5.0 | 7 days |

EXAMPLE 14

Fifty grams of polymer of the general formula

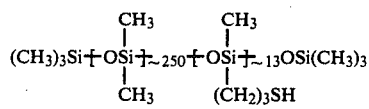

and having 2.3 weight percent —SH as determined by iodine titration was placed in a polyethylene tube equipped with a stirrer and sealing means and then de-aired for 15 minutes in a vacuum chamber. The polymer was then sealed in the tube, 0.6 g of stannous octoate was added to the polymer through a plunger device and then the stirrer was used to mix the tube contents. A sample extruded from the tube gelled on standing overnight at room temperature, whereas the material in the tube remained uncured.

EXAMPLE 15

A mixture of 50 g of polymer as described in Example 14 and 2 g of stannous octoate was prepared according to the procedure of Example 14. A sample of this mixture was immediately extruded from the tube. The extruded sample formed a gum-like material after one hour at room temperature and completely cured to an elastomeric material upon standing overnight. Another sample was extruded from the tube 1.5 hours after mixing. The extruded material was somewhat more viscous but still flowable. The extruded sample was about ¼ inch thick. The surface of the second extruded sample became gum-like in about 10 minutes and was fully cured on standing overnight at room temperature. The color of the extruded material changed from pale green to water white during curing. A third sample of the mixture was extruded from the tube two days after mixing. This extruded material was still flowable and formed a skin at room temperature about 10 minutes after being extruded. The remaining mixture in the sealed tube was still flowable after 3 months storage at room temperature.

EXAMPLE 16

One hundred grams of polymer of the average formula

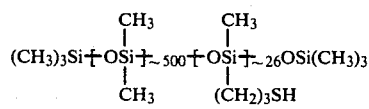

and having 2.25 weight percent —SH as determined by iodine titration was placed in a tube as described in Example 14 and then de-aired for 15 minutes in a vacuum chamber. The polymer was then sealed in the tube and 1.0 g of stannous octoate, which had previously been mixed with 5 g mineral oil, was added to the polymer through a plunger device and the stirrer was used to thoroughly mix the tube contents. A sample of the pale yellow mixture was extruded 5 minutes after mixing, developed a tacky surface in 12 minutes, and completely cured upon standing overnight at room temperature. Another sample of this mixture was extruded 16 hours after mixing. This extruded sample skinned over in about 11 minutes and cured completely overnight at room temperature. Thirteen days after mixing, a portion of the material in the sealed tube near the tube walls appeared to be cured, but the material in the center of the tube was flowable. A sample of the flowable material was extruded from the tube. This extruded sample skinned over in about 15 minutes and completely cured upon standing overnight at room temperature. Nearly 4 months after mixing, a plug of cured material had formed near the tube opening but the material at the center of the tube was flowable. A sample of this flowable material was extruded. This extruded sample skinned over in about 10 minutes, had a slightly tacky surface in 30 minutes and cured completely on standing overnight at room temperature. All of the above-noted cured materials were clear and colorless.

EXAMPLE 17

One hundred grams of polymer of the general formula

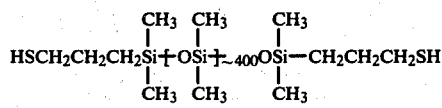

and having 0.23 weight percent —SH (or 0.0070 moles —SH/100 g polymer) as determined by iodine titration was placed in a tube as described in Example 14 and then de-aired for 1 hour in a vacuum chamber. The polymer was then sealed in the tube and a mixture of 5.0 g of the polymer as described in Example 16, and 1.0 g stannous octoate in 3.0 g toluene was added to the polymer through a plunger device and the stirrer was used to thoroughly mix the tube contents. A sample of this material was extruded immediately after mixing. Upon standing overnight at room temperature, a gum-like skin had formed on the extruded sample but the lower portion of the sample was uncured.

EXAMPLE 18

A mixture was prepared according to the procedure of Example 17 and using the same ingredients except that 5.0 g of stannous octoate in 1.0 g of toluene were used. A sample of the resulting mixture was extruded immediately after mixing. A definite skin was noted on the extruded sample in about 5 hours at room temperature. A second sample was extruded from the tube about 2 weeks after mixing and it was observed that the tube contents were flowable. The extruded material cured overnight at room temperature to a low durometer elastomer with the bottom portion of the sample having a lower cross-link density than the top portion.

EXAMPLE 19

One hundred grams of a polymer having an average formula

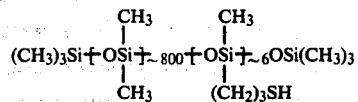

and having 0.4325 weight percent —SH as determined by iodine titration was mixed with 150 g of calcium carbonate filler by milling on a three-roll mill and deposited in a tube as described in Example 14 and then the mixture was de-aired for 1 hour in a vacuum chamber. The tube was sealed and 1.0 g stannous octoate was added and mixed as described in Example 14. A sample of this material was extruded immediately after mixing. The extruded sample formed a skin in 5 minutes and was tack-free in 18 minutes at room temperature. After 24 hours at room temperature the ⅛ inch sample was completely cured to a gum-like rubber elastomer.

EXAMPLE 20

A mixture of 250 g of polymer as described in Example 19, 250 g of calcium carbonate filler and 7.5 g stannous octoate was prepared in accordance with the procedure of Example 19 and allowed to cure at room temperature. The resulting elastomer had a tensile strength of about 552 kilopascals, a percent elongation of about 250, a 100 percent modulus of about 483 kilopascals, and durometer (Shore A) value of about 24.

Numerous modifications and variations in the practice of the invention are expected to occur to those skilled in the art upon consideration of the foregoing description and only such limitations as appear in the appended claims should be placed thereon.

What is claimed is:
1. A composition of matter comprising a material prepared by mixing
(A) a mercaptoorganopolysiloxane consisting essentially of a combination of units selected from dimethylsiloxane units, trimethylsiloxane units, hydroxydimethylsiloxane units, units of the formula

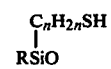

units of the formula

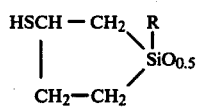

units of the formula

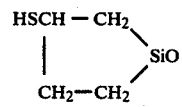

and units of the formula

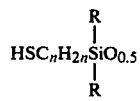

wherein R is a monovalent radical selected from the group consisting of alkyl radicals of from 1 to 3 carbon atoms inclusive and phenyl radicals; and, n has a value of from 1 to 4 inclusive, there being in said mercaptoorganopolysiloxane an average of greater than two mercapto-containing siloxane units per molecule and no more than 10 mole percent mercapto-containing siloxane units based on the total number of siloxane units in the mercaptoorganopolysiloxane;

(B) a stannous salt of a carboxylic acid selected from the group consisting of those represented by the formula $$Sn(OR^1)_2$$

wherein $R^1$ is a monovalent acyl radical, said stannous salt being present in an amount of from 0.1 to 10 parts by weight per 100 parts by weight of (A);

(C) a filler in an amount of from 0 to 200 parts by weight per 100 parts by weight of (A); and (D) an organic peroxide in an amount of from 0 to about 6 parts by weight per 100 parts by weight of (A).

2. The composition according to claim 1 and curable to an elastomer in which (A) comprises one or more mercaptoorganopolysiloxanes selected from the group consisting of those represented by the formulas:

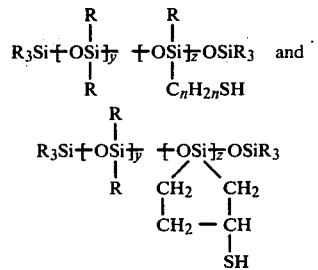

wherein $z \geq 2$ and $y+z$ has a value of from about 18 to 1000.

3. The composition according to claim 2 additionally including one or more mercaptoorganopolysiloxanes selected from the group consisting of those represented by the formulas

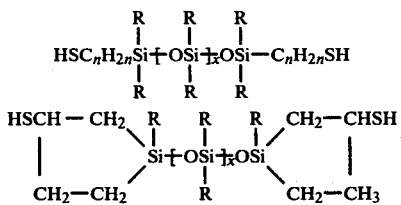

wherein x has a value of from 18 to 1000 and, in the composition, the average number of mercapto groups per molecule being at least 2.1.

4. The composition according to claim 1 in which (B) is stannous octoate.

5. The composition according to claim 1 in which (D) is present in an amount equal to from about 1 to about 6 percent by weight per 100 parts by weight of (A).

* * * * *

UNITED STATES PATENT AND TRADEMARK OFFICE
CERTIFICATE OF CORRECTION

PATENT NO. : 4,279,792
DATED : July 21, 1981
INVENTOR(S) : Gary R. Homan and Chi-long Lee It is certified that error appears in the above—identified patent and that said Letters Patent is hereby corrected as shown below:

Column 12 - Claim 3 - the portion of the formula reading "$CH_2-CH_3$" should read "$CH_2-CH_2$"

Signed and Sealed this

Twentieth Day of April 1982

|SEAL|

Attest:

GERALD J. MOSSINGHOFF

*Attesting Officer*  *Commissioner of Patents and Trademarks*